US012129174B2

(12) United States Patent
Kim et al.

(10) Patent No.: US 12,129,174 B2
(45) Date of Patent: Oct. 29, 2024

(54) CATALYST FOR WATER GAS SHIFT REACTION AT MIDDLE TEMPERATURE, PREPARATION METHOD THEREOF, AND HYDROGEN PREPARATION METHOD USING SAME (71) Applicants: RESEARCH INSTITUTE OF INDUSTRIAL SCIENCE & TECHNOLOGY, Pohang-si (KR); IUCF-HYU (INDUSTRY-UNIVERSITY COOPERATION FOUNDATION HANYANG UNIVERSITY), Seoul (KR)

(72) Inventors: Joon-Woo Kim, Gwangyang-si (KR); Young-Woong Suh, Seoul (KR); Dong-Jun Koh, Pohang-si (KR); Cheon-Woo Jeong, Seoul (KR)

(73) Assignees: Research Institute of Industrial Science & Technology, Pohang-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 720 days.

(21) Appl. No.: 17/285,576

(22) PCT Filed: Oct. 15, 2019

(86) PCT No.: PCT/KR2019/013454
§ 371 (c)(1),
(2) Date: Apr. 15, 2021

(87) PCT Pub. No.: WO2020/080775
PCT Pub. Date: Apr. 23, 2020

(65) Prior Publication Data
US 2022/0144630 A1 May 12, 2022

(30) Foreign Application Priority Data

Oct. 15, 2018 (KR) .................. 10-2018-0122646

(51) Int. Cl.
*C01B 3/16* (2006.01)
*B01J 21/02* (2006.01)
(Continued)

(52) U.S. Cl.
CPC ................ *C01B 3/16* (2013.01); *B01J 21/02* (2013.01); *B01J 23/80* (2013.01); *B01J 35/19* (2024.01);
(Continued)

(58) Field of Classification Search
CPC ........ B01J 21/02; B01J 23/80; B01J 35/0006; B01J 37/0236; B01J 37/031; B01J 37/06;
(Continued)

(56) References Cited

U.S. PATENT DOCUMENTS 5,990,040 A * 11/1999 Hu .............................. C01B 3/16
423/656
6,693,057 B1 2/2004 Cai et al.
(Continued)

FOREIGN PATENT DOCUMENTS

CN 101652176 A 2/2010
CN 102179251 A * 9/2011 .............. B01J 23/80
(Continued)

OTHER PUBLICATIONS

Original Chinese Office Action for corresponding Chinese Application No. CN201980067654.7 dated Dec. 9, 2022.
(Continued)

*Primary Examiner* — Patricia L. Hailey
(74) *Attorney, Agent, or Firm* — Renner, Otto, Boisselle & Sklar, LLP (57) ABSTRACT The present disclosure provides a catalyst for a water gas shift reaction at middle temperature, the catalyst comprising
(Continued)

a catalytically active component containing 40 to 80 mol % of copper (Cu), 15 to 50 mol % of zinc (Zn), and 1 to 13 mol % of aluminum (Al), relative to all metals of the catalyst, wherein an aluminum-rich layer is present in a surface layer of a particle of the catalyst. Furthermore, the present disclosure provides a preparation method of the catalyst, and a hydrogen preparation method using the same.

16 Claims, 7 Drawing Sheets

(51) Int. Cl.
    *B01J 23/80*     (2006.01)
    *B01J 35/00*     (2024.01)
    *B01J 37/02*     (2006.01)
    *B01J 37/03*     (2006.01)
    *B01J 37/06*     (2006.01)
    *B01J 37/08*     (2006.01)
    *B01J 37/18*     (2006.01)
(52) U.S. Cl.
    CPC ......... *B01J 37/0236* (2013.01); *B01J 37/031* (2013.01); *B01J 37/06* (2013.01); *B01J 37/08* (2013.01); *B01J 37/18* (2013.01); *C01B 2203/0283* (2013.01); *C01B 2203/1076* (2013.01); *C01B 2203/1088* (2013.01)
(58) Field of Classification Search
    CPC .. B01J 37/08; B01J 37/18; C01B 3/12; C01B 3/16; C01B 2203/0283; C01B 2203/1076; C01B 2203/1088
    USPC ......... 502/342, 343, 346; 428/403; 420/478; 423/655, 656
    See application file for complete search history.

(56) References Cited

U.S. PATENT DOCUMENTS

| | | | |
|---|---|---|---|
| 8,088,708 B2 * | 1/2012 | Takatsu | ................ B01J 35/393 429/502 |
| 2005/0238574 A1 | 10/2005 | Moon et al. | |
| 2009/0149324 A1 | 6/2009 | Madon et al. | |
| 2010/0112397 A1 | 5/2010 | Takatsu et al. | |
| 2014/0135210 A1 | 5/2014 | Budiman et al. | |
| 2014/0309102 A1 | 10/2014 | Basile et al. | |

FOREIGN PATENT DOCUMENTS

| | | | | |
|---|---|---|---|---|
| CN | 102350355 A | | 2/2012 | |
| CN | 103331166 A | * | 10/2013 | .............. B01J 23/80 |
| CN | 108435182 A | | 8/2018 | |
| EP | 1298089 A1 | * | 4/2003 | ........... B01J 23/005 |
| JP | 2004-202310 A | | 7/2004 | |
| JP | 2005-520689 A | | 7/2005 | |
| JP | 2012-139637 A | | 7/2012 | |
| JP | 5421770 B2 | | 2/2014 | |
| JP | 2015-505799 A | | 2/2015 | |
| JP | 2012-183459 A | | 9/2021 | |
| KR | 10-2005-0103568 A | | 11/2005 | |
| KR | 10-0859743 B1 | | 9/2008 | |
| KR | 10-2010-0100934 A | | 9/2010 | |
| KR | 10-2014-0060417 A | | 5/2014 | |
| KR | 10-1626014 B1 | | 6/2016 | |
| KR | 10-1792574 B1 | | 11/2017 | |
| KR | 10792574 B1 | * | 11/2017 | .............. B01J 21/04 |
| WO | WO-03082468 A1 | * | 10/2003 | .............. B01J 23/80 |
| WO | 2018/088736 A1 | | 5/2018 | |

OTHER PUBLICATIONS

Original and English Translation of International Search Report for corresponding International Patent Application No. PCT/KR2019/013454, dated Jan. 21, 2020.
Supplementary European Search Report issued for EP Application No. 19873092.1, dated Nov. 26, 2021.
Figueiredo et al., "Influence of the preparation methods and redox properties of Cu/ZnO/Al "2O" 3 catalysts for the water gas shift reaction," Journal of Molecular Catalysis A: Chemical, Elsevier, Amsterdam, NL, vol. 318, No. 1-2, Mar. 1, 2010 (Mar. 1, 2010), pp. 15-20, XP026855401.
Office Action mailed Apr. 26, 2022 in corresponding Japanese Application No. 2021-520589.

* cited by examiner

CATALYST FOR WATER GAS SHIFT REACTION AT MIDDLE TEMPERATURE, PREPARATION METHOD THEREOF, AND HYDROGEN PREPARATION METHOD USING SAME

This application is a national phase of International Application No. PCT/KR2019/013454 filed on Oct. 15, 2019, which claims priority to KR Application No. 10-2018-0122646, filed on Oct. 15, 2018, all of which are hereby incorporated by reference.

TECHNICAL FIELD

The present disclosure relates to a highly active catalyst for a water gas shift reaction that may be used to convert carbon monoxide (CO) and water ($H_2O$) into carbon dioxide ($CO_2$) and hydrogen ($H_2$), a method for preparing the catalyst, and a method for converting carbon monoxide and water into hydrogen and carbon dioxide in a reaction including the water in a gas mixture containing the carbon monoxide in a middle temperature range using the catalyst.

BACKGROUND ART

Hydrogen may be a basic material that may be applied in various industrial fields to add high value-added technology, and may play an important role as a next-generation energy source, such as fuel cells, as well as in the petrochemical industry. Accordingly, various types of research into catalysts and process technologies that may produce high-purity hydrogen or reduce production costs are underway.

Technology for producing hydrogen may include a method of preparing hydrogen by a catalytic reaction of steam reforming of fossil fuels, and a method of preparing hydrogen using a catalyst for a water gas shift reaction of a mixed gas containing carbon monoxide. Thereamong, the water gas shift reaction may be a reaction of converting carbon monoxide and water into hydrogen and carbon dioxide by reacting the carbon monoxide with water vapor, which may be an exothermic reaction having the following reaction relationship.

$$CO+H_2O \rightarrow H_2+CO_2, \Delta H=-41.1 \text{ kJ/mol} \qquad (1)$$

The water gas shift reaction may generally produce hydrogen from carbon monoxide through two operations: a high temperature shift (HTS) reaction and a low temperature shift (LTS) reaction. In general, in a commercial process, the HTS reaction may be carried out around 300 to 450° C. and used for converting a large amount of carbon monoxide, and the LTS reaction may be carried out around 200 to 300° C. and used for high purity to convert residual carbon monoxide after the HTS reaction.

The water gas shift (WGS) reaction may be affected by an equilibrium shift rate and may thus operate sensitively to temperature, to determine a composition of a product. This means that, as described above, since the water gas shift reaction may be an exothermic reaction to occur a reverse reaction at high temperature, hydrogen and carbon dioxide may be reacted to generate carbon monoxide. Therefore, in terms of generation of hydrogen, it is more advantageous to maintain temperature conditions at a low temperature in the water gas shift reaction.

Meanwhile, since a catalyst in the HTS reaction may be generally based on iron (Fe), and a small amount of chromium (Cr) may be added to stably induce the reaction, the iron may be prevented from sintering thereof and may increase activity thereof due to the chromium. Therefore, a reaction rate may be accelerated to treat a large amount of carbon monoxide (CO), but due to the exothermic reaction, 2 to 4% of an initial molar amount of carbon monoxide may remain. Accordingly, in order to remove the residual carbon monoxide, it is necessary to use a catalyst for an LTS reaction. Since the catalyst for an LTS reaction may be based on copper-zinc (Cu—Zn) and may reach an equilibrium shift rate, depending on reaction conditions, a shift rate of carbon monoxide of 99% or more may be achieved at a low temperature.

Therefore, various catalysts, based on copper-zinc, for a water gas shift reaction have been developed and used. For example, as disclosed in Korean Patent No. 15551509, although a catalyst for a water gas shift reaction, containing copper, zinc, and alumina, is developed, there is still a need for a catalyst to increase a shift rate of carbon monoxide.

DISCLOSURE

Technical Problem

An aspect of the present disclosure is to provide a catalyst maintaining high activity of the catalyst within a temperature range of 200 to 450° C. and having a high carbon monoxide shift rate in a process of preparing hydrogen gas from carbon monoxide, a method for preparing the catalyst, and a method for preparing hydrogen using the catalyst.

Technical Solution

According to an aspect of the present disclosure, a catalyst for a water gas shift reaction includes a catalytically active component containing 40 to 80 mol % of copper (Cu), 15 to 50 mol % of zinc (Zn), and 1 to 13 mol % of aluminum (Al), relative to all metals of the catalyst, wherein an aluminum-rich layer is present in a surface layer of a particle of the catalyst.

According to an aspect of the present disclosure, a method of preparing a catalyst for a water gas shift reaction, includes a copper-zinc coprecipitation operation of injecting a metal precursor solution containing a Cu precursor and a Zn precursor into a precipitant solution to coprecipitate copper and zinc, to produce a copper-zinc coprecipitate; an Al precipitation operation of injecting an Al precursor solution into a solution containing the copper-zinc coprecipitate to precipitate aluminum on a surface of the copper-zinc coprecipitate, to prepare a CuZnAl catalyst precursor material having an aluminum-rich layer on a surface; and a baking operation of baking the CuZnAl catalyst precursor material to prepare a CuZnAl catalyst.

According to an aspect of the present disclosure, a method of preparing hydrogen, includes providing the catalyst of the present disclosure, or a catalyst prepared by the method of the present disclosure, to perform a water gas shift reaction.

Advantageous Effects

According to an aspect of the present disclosure, a catalyst for a water gas shift reaction, according to the present disclosure, may be easy to operate within a temperature range of 250 to 350° C., which may be a middle temperature range between a high temperature shift (HTS) reaction and a low temperature shift (LTS) reaction, may have high catalytic activity, may have an excellent CO shift rate even under high temperature conditions due to exothermic reaction, and may have stable high performance even under low water vapor/carbon dioxide ratio conditions. In addition, due to its excellent hydrothermal durability, deactivation may not occur even when exposed to high-temperature steam for a long time.

BEST MODE FOR INVENTION

Hereinafter, preferred embodiments of the present disclosure will be described with reference to the accompanying drawings. However, embodiments of the present disclosure may be modified in various other forms, and the scope of the present disclosure is not limited to embodiments described below.

There may be a problem in that a conventional continuous reaction system of a high temperature shift (HTS) reaction and a low temperature shift (LTS) reaction is difficult to be simplified because operating temperatures of the continuous reaction system may be different as described above, and a catalyst should be thus used differently, depending on a temperature.

In addition, hydrogen may be produced by dissociation of water vapor. According to Le Chatelier's principle, an increase in concentration of reactants may occur a forward reaction. In addition, since a rate of dissociating water vapor may be slower than a rate of generating carbon dioxide, it is necessary to supply an amount of water vapor greater than a stoichiometric ratio thereof, to smoothly supply oxygen atoms generated by the dissociation to maintain a high CO shift rate. Although a water gas shift reaction is carried out to stoichiometrically react carbon monoxide and water vapor in a ratio of 1 mol:1 mol, an excessive amount of water vapor may be supplied in an actual commercial process.

In this case, when oxygen is not smoothly supplied, carbon deposition from carbon monoxide in an Fe catalyst may occur to cause deactivation of the catalyst easily. Therefore, when an excessive amount of water vapor is supplied in such a manner, there may be a problem that energy for converting water, initially supplied, into the water vapor may be required to be supplied in a much higher ratio than a stoichiometric ratio thereof.

In addition, since a temperature of a reaction gas supplied to a reactor for an HTS reaction may be 300° C. or higher, enormous energy may be required to heat the water vapor in a water vapor/carbon dioxide molar ratio of 3.0. Even when heat of the reaction is recovered, insufficient energy should be supplied from an external heat source such as a boiler or the like.

In addition, a catalyst for an LTS reaction may be based on copper, and may undergo a water gas shift reaction even at a low temperature, but may have low durability against long-term exposure to water vapor, and heat of the reaction may increase due to excessive supply of CO. Therefore, there may be a problem that the catalyst may cause a decrease in activity due to sintering of the copper.

Figure 1:
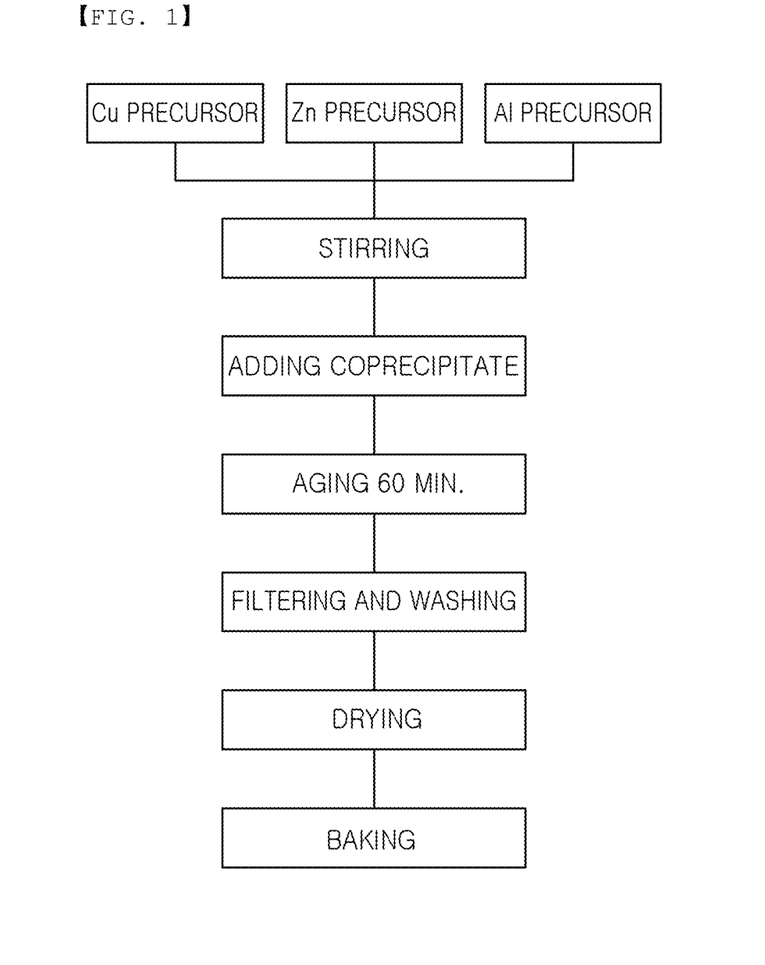
FIG. 1 is a process flow of a conventional one-step method of preparing a catalyst for a water gas shift reaction.

Accordingly, conventionally, a catalyst for a water gas shift reaction, including copper, zinc, and aluminum, prepared by a one-step method as illustrated in FIG. 1, has been developed, but a carbon monoxide shift rate of the catalyst may not be high.

Accordingly, the present disclosure provides a catalyst maintaining activity of the catalyst at a certain temperature and having a high carbon monoxide shift rate, a method of preparing the catalyst, and a method of preparing hydrogen using the catalyst.

In the present disclosure, the term "coprecipitation" may also be referred to as "precipitation," which means precipitating precipitation targets in a solution or all precipitation targets.

In the present disclosure, a middle temperature may refer to a temperature range of 250 to 350° C.

The present disclosure may provide a catalyst for a water gas shift reaction including a catalytically active component containing 40 to 80 mol % of copper (Cu), 15 to 50 mol % of zinc (Zn), and 1 to 13 mol % of aluminum (Al), relative to all metals of the catalyst.

In the catalyst of the present disclosure, reasons for controlling the components as described above will be described in detail.

Cu may be an active metal and may be an essential element in a catalyst for a water gas shift reaction. When an amount thereof is less than 40 mol %, there may be a problem that the number of active sites may decrease. When an amount thereof exceeds 80 mol %, activity of the catalyst may occur sufficiently, but there may be a problem that the activity of the catalyst increases due to an increase in size of a particle of Cu.

Zn may be an element playing a role of a structural stabilizer of Cu in the water gas shift reaction. When an amount thereof is less than 15 mol %, there may be a problem that it may be insufficient to sufficiently perform the role of Zn as the structural stabilizer of Cu. When an amount thereof exceeds 50 mol %, there may be a problem that the ratio of Cu decreases to deteriorate activity of the catalyst.

Al may be generally hydrophilic and may be advantageous in dissociating water.

In this case, when an amount of aluminum is less than 1 mol %, there may be a problem that it may be insufficient to enhance structural or electronic activity of the catalyst, and when an amount of aluminum exceeds 13 mol %, there may be a problem that a crystal structure of an aluminum precursor becomes hydrotalcite, which may not be advantageous for activity thereof.

The catalyst for a water gas shift reaction may have an aluminum-rich layer in a surface layer of a particle of the catalyst. Therefore, since the catalyst of the present disclosure may have a large amount of aluminum, hydrophilic, on its surface to easily dissociate water, aluminum may play a role in protecting copper, an active metal, to improve durability of the catalyst, even when the catalyst is exposed to water vapor for a long time.

In this case, aluminum may be mainly distributed in an outward portion of the catalyst for a water gas shift reaction, and the aluminum-rich layer refers to about 0.1 to 10% of a radius of the particle of the catalyst, from the surface layer of the particle of the catalyst.

A catalyst for a water gas shift reaction according to the present disclosure may provide a catalyst for a water gas shift reaction having a high activity at 200 to 450° C., more preferably 250 to 350° C., and having a carbon monoxide shift rate of 98.5% or more at this temperature.

The present disclosure may provide a method of preparing a catalyst for a water gas shift reaction.

A method of preparing a catalyst for a water gas shift reaction, of the present disclosure, may include a copper-zinc coprecipitation operation of mixing a metal precursor solution containing a Cu precursor and a Zn precursor and a precipitant solution to coprecipitate copper and zinc, to produce a copper-zinc coprecipitate; an Al precipitation operation of injecting an Al precursor solution into a solution containing the copper-zinc coprecipitate to precipitate aluminum on a surface of the copper-zinc coprecipitate, to prepare a CuZnAl catalyst precursor material having an aluminum-rich layer on a surface; and a baking operation of baking the CuZnAl catalyst precursor material to prepare a CuZnAl catalyst.

Figure 2:
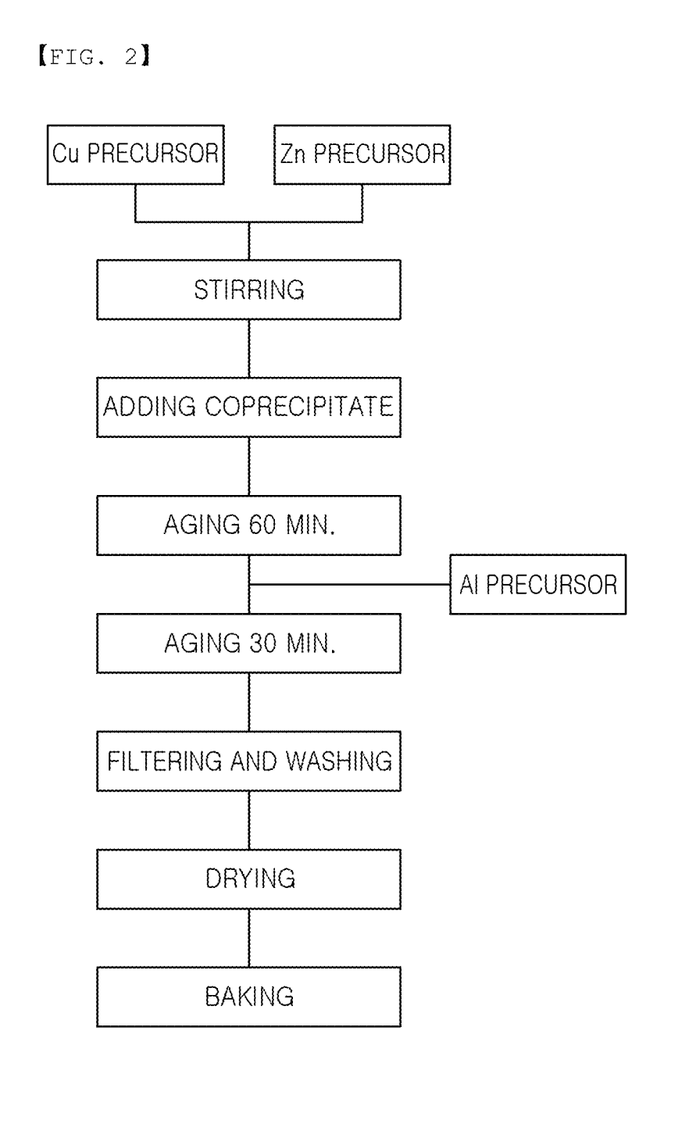
FIG. 2 is a process flow of a two-step method of preparing a catalyst for a water gas shift reaction, according to the present disclosure.

In this case, the copper-zinc coprecipitation operation may be performed and the Al precipitation operation may be then performed. A process flow of the method is illustrated in FIG. 2.

Copper-Zinc Coprecipitation Operation

The copper-zinc coprecipitation operation may synthesize a precipitate by injecting a Cu precursor and a Zn precursor into a precipitant solution, for example, may coprecipitate Cu and Zn by preparing a solution of a Cu precursor and a Zn precursor, and injecting the solution containing the Cu precursor and the Zn precursor into a solution containing a precipitant.

The Cu precursor may be a metal precursor having $Cu^{2+}$ as a cation, and an anion moiety selected from the group consisting of $NO_3^-$, $SO_4^{2-}$, $CH_3COO^-$, $HCOO^-$, $Cl^-$, and $I^-$.

The Zn precursor may be a metal precursor having $Zn^{2+}$ as a cation, and an anion moiety selected from the group consisting of $NO_3^-$, $SO_4^{2-}$, $CH_3COO^-$, $HCOO^-$, $Cl^-$, and $I^-$.

The copper-zinc coprecipitation operation may include an aging process. The aging process may include synthesizing a solution containing a copper-zinc coprecipitate and performing at the same temperature as an initial temperature of the precipitant for 30 to 180 minutes.

Amounts of Cu and Zn Precursors

In the method for preparing the catalyst, a concentration of the solution containing Cu and Zn precursors may be 0.1 to 1.5 M. When a concentration of the solution is lower than 0.1 M, amounts of the Cu and Zn precursors may be low, to be difficult to form a catalyst. When a concentration of the solution exceeds 1.5 M, there may be a problem that it is difficult to make a solution. The method for preparing the catalyst, in which a molar ratio of the Cu precursor and the Zn precursor is 50:50 to 80:20, may be provided. When a molar ratio of the Cu precursor and the Zn precursor is 0:100 to less than 50:50, the number of active sites may be small to decrease activity of the catalyst. Therefore, a problem such as a reduction in CO conversion may occur. When a molar ratio of the Cu precursor and the Zn precursor is more than 80:20 to 100:0, an amount of Zn may be small to increase the number of particles of Cu. Therefore, there may be a problem that an area from which Cu is exposed increases, making it difficult to maintain activity of the catalyst.

Precipitant Solution

A precipitant solution used in the copper-zinc coprecipitation operation may be weakly basic, and, may include, for example, at least one precipitant selected from the group consisting of alkali metal, carbonate or bicarbonate of Li, Na, K, or ammonium, NaOH, and $NH_4OH$.

The method for preparing the catalyst, in which, before the injection of the metal precursor solution, a temperature of the precipitant solution may be room temperature (20° C.) to 80° C., and a pH of the precipitant solution is about 6 to 9, may be provided. When a temperature of the precipitant solution, before the injection of the metal precursor solution, exceeds 80° C., water in the solution may be likely to evaporate, and formation of a particle may be accelerated, making it difficult to synthesize a uniformly dispersed catalyst. Furthermore, when a temperature of the precipitant solution, before the injection of the metal precursor solution, is less than 20° C., it may be difficult to cause a precipitation reaction, to take a long time to prepare a catalyst. In addition, when a pH of the precipitant solution exceeds 9, there may be a problem that an oxide is formed immediately, and when a pH of the precipitant solution is less than 6, there may be a problem that a precipitate is not formed.

Therefore, an initial concentration of the precipitant solution may be 0.01 to 1.2 M. When an initial concentration of the precipitant solution is less than 0.01 M, a volume of the precipitant solution may greatly increase to precipitate the metal precursor solution. Therefore, there may be a problem of inefficiently synthesizing the catalyst. When an initial concentration of the precipitant solution exceeds 1.2 M, there may be a problem that a pH to be achieved after the injection of the metal precursor solution may not be achieved. The concentration of the precipitant solution is preferably a concentration capable of maintaining the suggested pH range.

Cu and Zn Precipitation Operation

In a Cu and Zn precipitation operation, a copper-zinc coprecipitate may be prepared by injecting a metal precursor solution containing Cu and Zn precursors into a precipitant solution.

When a metal precursor solution containing Cu and Zn precursors is injected into the precipitant solution, the solution may be injected until the pH becomes 5 to 8. When the solution is injected to have a pH of less than 5, there may be a problem that both of the Cu and Zn precursors react with the precipitant solution, and Al may not be precipitated later. When the solution is injected to have a pH of higher than 8, there may be a problem that Cu and Zn may not be sufficiently precipitated to deteriorate activity of the catalyst.

Al Precipitation Operation

In an Al precipitation operation, an Al precursor solution may be injected into a solution containing the copper-zinc coprecipitate to precipitate aluminum on a surface of the copper-zinc coprecipitate. Therefore, it is possible to obtain a catalyst having an aluminum-rich layer in a surface layer of a particle of the catalyst, which is desired to be obtained in the present disclosure.

The Al precursor solution may be a metal precursor having $Al^{3+}$ as a cation, and an anion moiety selected from the group consisting of $NO_3^-$, $SO_4^{2-}$, $CH_3COO^-$, $HCOO^-$, $Cl^-$, and $I^-$.

Amount of Al Precursor Solution

A concentration of the Al precursor solution may be 0.01 to 1.5 M. When a concentration of the Al precursor solution is less than 0.01 M, an amount of the Al precursor solution may be small and an amount of a solvent may be large. Therefore, there may be a problem that, since it takes a long time to prepare a catalyst, it may be difficult to form the catalyst. When a concentration of the Al precursor solution exceeds 1.5 M, there may be a problem that, since solubility of the Al precursor solution may not be high, it may be difficult to make it into a solution.

The Al precursor solution may be injected, after a phenomenon after which a pH is reduced to a range of about 0.05 to 0.2 and is then returned during the aging of the copper-zinc coprecipitation operation. In this case, the after a phenomenon after which a pH is reduced to a range of about 0.05 to 0.2 and is then returned, may refer to the copper-zinc coprecipitate being changed from an amorphous form to a crystalline form. Therefore, the Al precursor solution may be injected, after the copper-zinc coprecipitate is changed from an amorphous form to a crystalline form during the aging of the copper-zinc coprecipitation operation.

The Al precipitation operation may include an aging process. The aging process may include injecting the Al precursor solution into the solution containing the copper-zinc coprecipitate synthesizing and performing an aging process at the same temperature as an initial temperature of the precipitant solution for 15 to 60 minutes.

In this case, the Al precursor solution may be injected until a pH is 5 to 7. When the solution is injected to have a pH of less than 5, there may be a problem in process efficiency due to a large amount of Al, not precipitated. When the solution is injected to have a pH of higher than 7, there may be a problem that Al may not be sufficiently precipitated to deteriorate activity of the catalyst.

Filtration and Washing Operation

A filtration and washing operation may include a filtration and washing operation of removing unnecessary ions, except for a CuZnAl catalyst precursor material, through subsequent filtration and washing processes in the Al precipitation operation, to obtain the CuZnAl catalyst precursor material. In this case, the CuZnAl catalyst precursor material may be added to distilled water, and may be stirred to dilute unnecessary ions remaining in a solid, and the solid may be recovered by a filtration device. Such a process may be repeated in several times.

Drying Operation

A drying operation may be required to remove moisture from the prepared CuZnAl catalyst precursor material, and may include a drying operation of drying the CuZnAl catalyst precursor material obtained in the filtration and washing operation in an oven within a temperature range of 100 to 300° C. for 22 to 24 hours. In this case, when a temperature of the drying operation is less than 100° C., it may take a long time to remove moisture, and when a temperature of the drying operation exceeds 300° C., a crystal structure may be changed to have an oxide state, making it difficult to grasp characteristics of the CuZnAl catalyst precursor material.

Baking Operation

A baking operation may be required for changing to have an oxide form, before activating a catalyst, and may include a baking operation of baking at 300 to 500° C. In this case, when a temperature of the baking operation is less than 300° C., there is a possibility that a problem of stability of the catalyst may occur after the activation, because it is not sufficiently changed to have an oxide form, and, when a temperature of the baking operation exceeds 500° C., there may be a problem that a size of a particle increases due to the high temperature.

The present disclosure may provide a method for producing a water gas shift reaction catalyst including a reduction operation of performing a reduction reaction of the catalyst of the present disclosure or the catalyst prepared according to the preparation method of the present disclosure under a hydrogen atmosphere of 280 to 500° C.

The present disclosure may provide a method for preparing hydrogen.

The present disclosure may include a reduction operation of performing a reduction reaction of a catalyst for a water gas shift reaction according to the present disclosure, under a hydrogen atmosphere of 280 to 500° C., prior to the method for preparing hydrogen.

In this case, the reduction operation may be necessary to change copper oxide into copper, which may be an active metallic state. When a temperature of the reduction operation is less than 280° C., there may be a problem that the reduction may not occur sufficiently, and when a temperature of the reduction operation exceeds 500° C., there may be a problem that an alloy of Cu and Zn is made or a size of a particle increases.

A composition of a mixed gas for the water gas shift reaction should include carbon monoxide, and may be, for example, a mixed gas containing 1.5 mol % $H_2$, 25.5 mol % $N_2$, 60 mol % CO, and 13 mol % $CO_2$.

The present disclosure may provide a method for producing hydrogen using a catalyst according to the present disclosure or a catalyst prepared according to a preparation method of the present disclosure.

The hydrogen preparation method of the present disclosure may provide a hydrogen preparation method including an operation of providing a catalyst according to the present disclosure or a catalyst prepared according to a preparation method of the present disclosure, in a water gas shift reaction.

The catalyst may be reduced under a hydrogen atmosphere of 280 to 500° C.

In a hydrogen preparation method according to the present disclosure, a reaction temperature in the operation may be 200 to 450° C., and a molar ratio of water vapor/carbon monoxide may be 1.0 to 3.0, to provide a hydrogen preparation method using a water gas shift reaction.

When a reaction temperature is less than 200° C., there may be a problem that energy supplied may be lower than activation energy required to prepare hydrogen. When a reaction temperature exceeds 450° C., since the hydrogen production reaction may be an exothermic reaction, as a temperature increase, there may be a problem that a reverse reaction may occur and the reaction may be limited. In addition, when a molar ratio of water vapor/carbon monoxide is less than 1.0, carbon monoxide may not be consumed, and thus hydrogen may not be synthesized as much, and when a molar ratio of water vapor/carbon monoxide exceeds 3.0, there may be a problem of separating an excessive amount of unreacted water vapor.

In a hydrogen preparation method according to the present disclosure, a water gas shift reaction may provide production of hydrogen from by-product gas, production of hydrogen from synthesis gas, production of hydrogen from gas producing hydrogen and carbon monoxide by reforming reaction from fossil fuels, production of hydrogen from fuel reformer of a fuel cell, or production of hydrogen by a petrochemical process.

Hereinafter, the present disclosure will be described in more detail through specific examples. The following examples are only illustrative to aid understanding of the present disclosure, and the scope of the present disclosure is not limited thereto.

EXAMPLE

1. Preparation of Catalyst for Water Gas Shift Reaction

Example 1

First, a metal precursor solution containing a Cu precursor and a Zn precursor, and an Al precursor solution were prepared, respectively. A molar ratio of the Cu precursor and the Zn precursor was 70:30, and a molar ratio of the Al precursor was 4%, based on the total metal ions. A concentration of the metal precursor solution in which the prepared Cu precursor and the prepared Zn precursor were mixed was 1.2 M, and a concentration of the Al precursor solution was also 1.2 M. In addition, $NO_3^-$ was used as an anion moiety of each of the metal precursors. For precipitation, an aqueous solution having a concentration of 0.1 M (a precipitant solution, pH about 8) was prepared using basic $NaHCO_3$.

When all of the solutions were prepared, the precipitant solution was heated to a temperature of about 70° C., and then the metal precursor solution containing the Cu precursor and the Zn precursor was injected until a pH was about 6. This corresponds to a period from 0 to about 15 minutes, illustrated in FIG. 5, and it can be seen that the injected solution (a solution containing the Cu and Zn precursors) was acidic, and thus a pH thereof tended to decrease.

Figure 5:
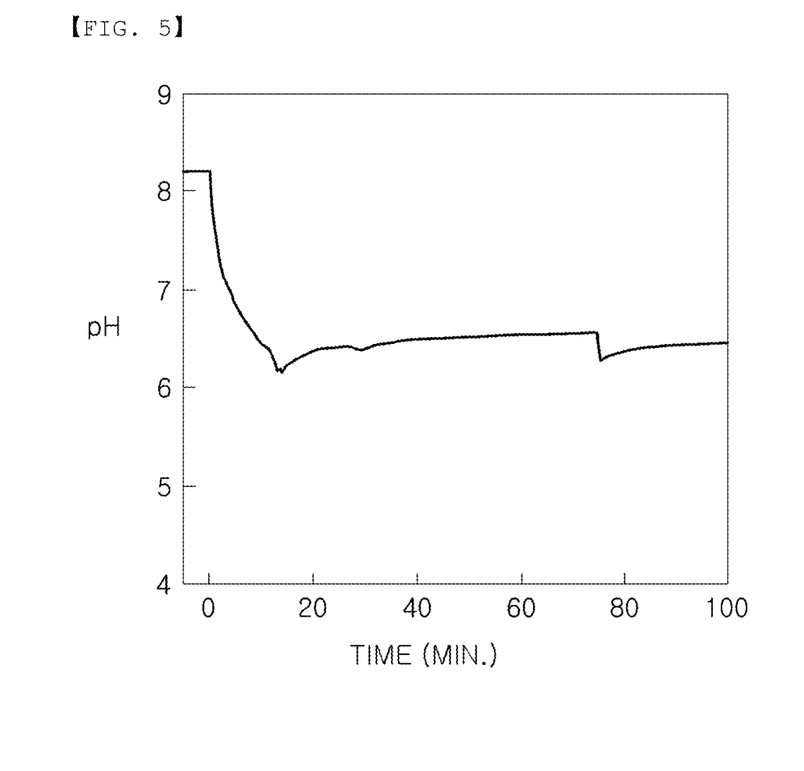
FIG. 5 is a graph illustrating a change in pH over time during a first aging process and a second aging process, when preparing a catalyst for a water gas shift reaction of Example 1.

An aging process started from a point in time at which a pH does not decrease (from a point in time of about 15 minutes in FIG. 5).

Next, when a precipitate was formed, the aging process was first performed at the same temperature for about 1 hour. During the aging process, it can be found that a pH decreased by about 0.1, and was then recovered, which refers to a phenomenon in which the precipitate was changed from an amorphous form to a crystalline form (pH at a point in time of about 30 minutes in FIG. 5).

When 45 minutes were elapsed after this phenomenon appeared (at a point in time of about 75 minutes in FIG. 5), the Al precursor solution was injected. After injecting the Al precursor solution, the aging process was performed for about 30 minutes.

The precipitate formed by the aging process was filtered and recovered using a filter paper, and the recovered precipitate was washed using distilled water to remove unnecessary ions.

Then, the recovered precipitate was dried for about 12 hours in an oven set to a temperature of 105° C. to prepare a catalyst precursor material.

The prepared catalyst precursor material was baked for 3 hours at a temperature of 400° C. (5° C./min) in a muffle furnace to prepare a catalyst.

A schematic diagram of a method of preparing a catalyst according to Example 1 was illustrated in FIG. 2.

Figure 4:
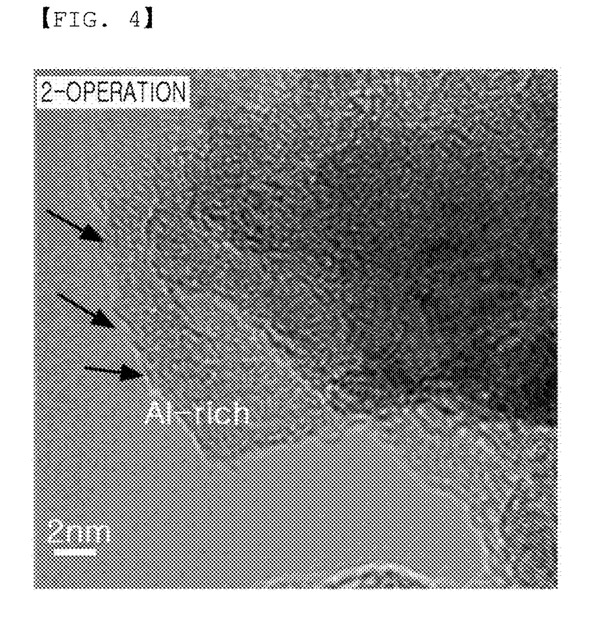
FIG. 4 is an image of a portion of a catalyst for a water gas shift reaction, prepared according to Example 1, captured by a transmission electron microscope (TEM).

An image of a portion of a catalyst for a water gas shift reaction, prepared according to Example 1, captured by a transmission electron microscope (TEM), was shown in FIG. 4.

Comparative Example 1

175 mL of a 1.2 M concentration metal precursor solution in which Cu, Zn, and Al precursors were mixed was prepared. Thereafter, a precipitation process was performed by injecting the metal precursor solution in which the Cu, Zn and Al precursors were mixed in a precipitant aqueous solution having the same temperature and pH, as in Example 1, into the precipitant, and an aging process was performed for 1 hour and 30 minutes. In addition, filtering, washing, drying, and baking processes were all performed under the same conditions as in Example 1 to synthesize a catalyst.

A schematic diagram of a method of preparing a catalyst according to Comparative Example 1 was illustrated in FIG. 1.

Figure 3:
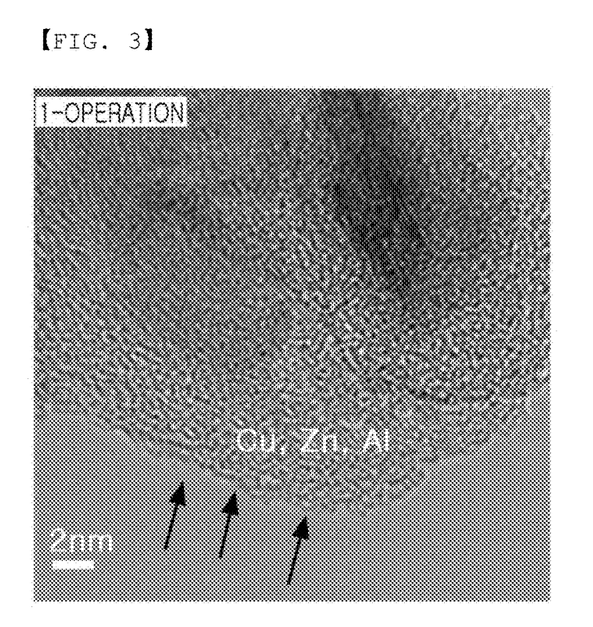
FIG. 3 is an image of a portion of a copper-based catalyst prepared according to Comparative Example 1, captured by a transmission electron microscope (TEM).

An image of a portion of a catalyst for a water gas shift reaction, prepared according to Comparative Example 1, captured by a transmission electron microscope (TEM), was shown in FIG. 3.

2. Comparison of Distribution of Each Metal in CuZnAl Catalyst

Figure 6A:
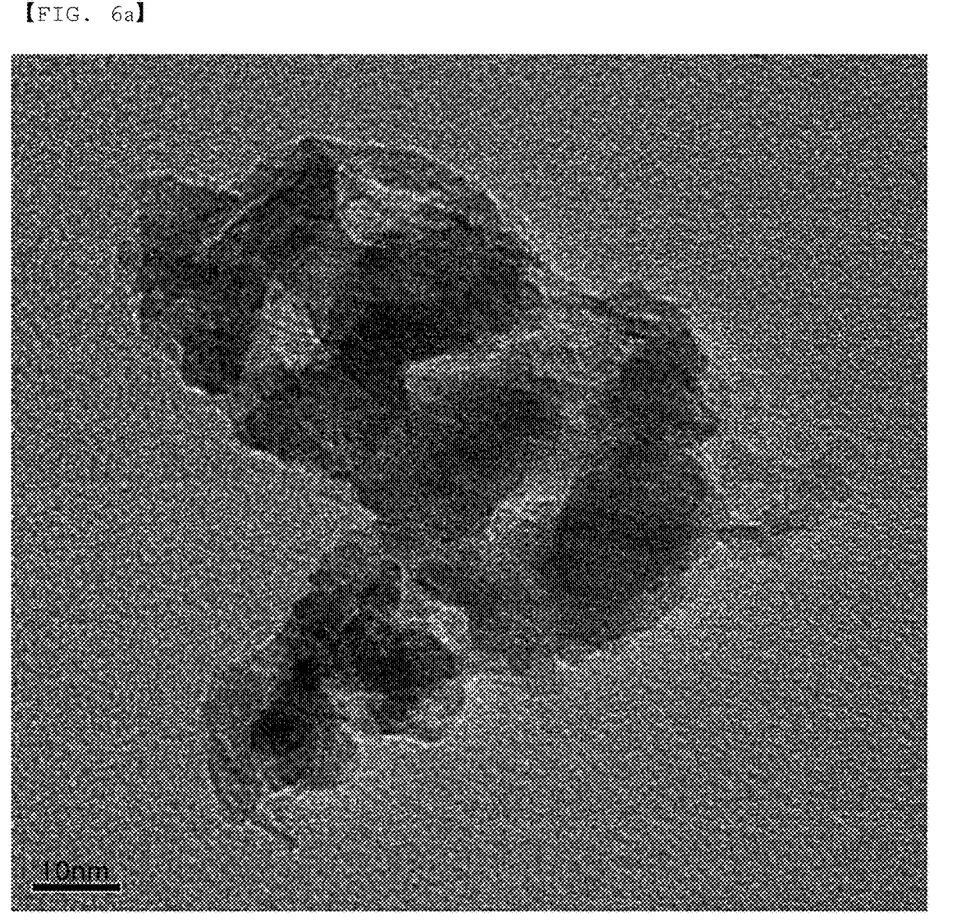
FIG. 6A is an image of particles of a catalyst prepared according to Example 1, captured by TEM.
Figure 6B:
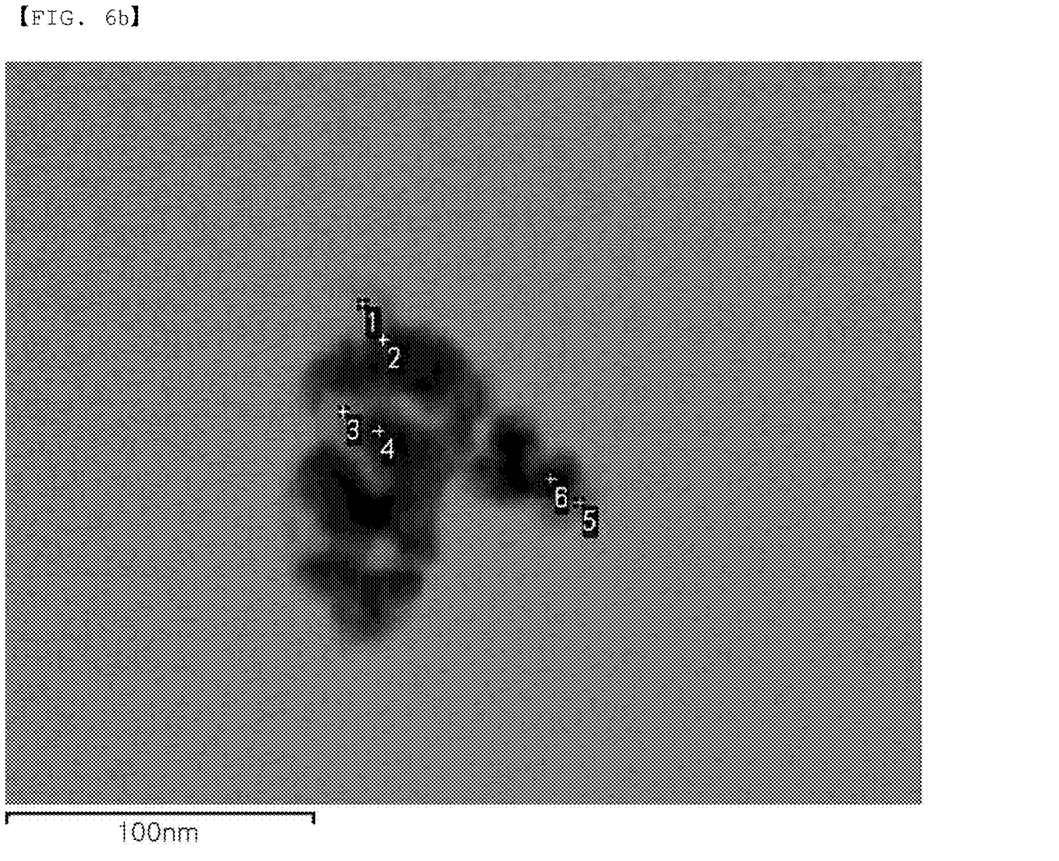
FIG. 6B shows an arbitrary site in particles of a catalyst of FIG. 6A set for measuring a weight ratio or an atomic ratio of aluminum in the particles of the catalyst.

An image of a particle of the catalyst prepared according to Example 1, captured by TEM, was shown in FIG. 6A, amounts of the aluminum were analyzed as concentrations by position in a particle of a catalyst, using an Energy Dispersive Spectrometer (EDS) of TEM, and results thereof were listed in Table 1. FIG. 6B shows positions of spectrum 1 to 6 of Table 1 in a particle of a catalyst.

TABLE 1

| Spectrum No. | O | Al | Cu | Zn | Total |
|---|---|---|---|---|---|
| Mass Ratio (Weight ratio) (%) | | | | | |
| 1 | 52.62 | 44.53 | 0.00 | 2.85 | 100.00 |
| 2 | 22.44 | 9.15 | 46.93 | 21.48 | 100.00 |
| 3 | 49.63 | 32.14 | 0.00 | 18.22 | 100.00 |
| 4 | 23.27 | 2.22 | 51.89 | 22.62 | 100.00 |
| 5 | 31.39 | 35.55 | 24.58 | 8.47 | 99.99 |
| 6 | 24.14 | 6.61 | 40.54 | 28.72 | 100.01 |
| Atomic Ratio (Atomic Ratio) (%) | | | | | |
| 1 | 66.00 | 33.13 | 0.00 | 0.87 | 100.00 |
| 2 | 49.94 | 12.07 | 26.29 | 11.70 | 100.00 |
| 3 | 67.85 | 26.05 | 0.00 | 6.10 | 100.00 |
| 4 | 53.88 | 3.05 | 30.25 | 12.82 | 100.00 |
| 5 | 51.69 | 34.70 | 10.19 | 3.41 | 99.99 |
| 6 | 53.3 | 8.65 | 22.53 | 15.52 | 100.00 |

As listed in Table 1, it was found that amounts or ratios of Al in a portion of a surface layer of a particle of a catalyst prepared by the method of the present disclosure was significantly higher than that of Cu and Zn. In addition, an aluminum-rich layer exhibited mass ratios and atomic ratios, as shown in spectrum 1, 3, and 5 of FIG. 6B.

3. Comparative Evaluation of Carbon Monoxide Shift Ratio According to Catalyst Structure Specimens of each of the catalysts of Example 1 and Comparative Example 1 were molded into a size of 2 cm in diameter and 3 cm in height, and baked at 600° C. for 1 hour. In addition, before the evaluation, the catalysts were reduced to hydrogen. A reduction gas was introduced into a layer of each of the catalysts by mixing 50 ml/min of $H_2$ and 450 ml/min of $N_2$ by a mass flow controller, and reduced at normal pressure (1 atm) while increasing at a temperature increase rate of 1° C./min to 400° C.

For each of the baked and reduced catalysts of Example 1 and Comparative Example 1, performance was evaluated in a fixed bed catalytic reaction system including a reaction gas supply unit, a liquid evaporation unit, a water gas shift reaction unit, a cooling unit, and an analysis unit. A reaction gas was simulated and supplied using a mass flow controller, and a composition thereof included 1.5 mol % $H_2$, 25.5 mol % $N_2$, 60 mol % CO, and 13 mol % $CO_2$. Liquid reactants such as water were supplied to the liquid evaporation unit using a high-pressure metering pump, preheated to 250° C., and then supplied to a reaction unit. The reaction gas containing water vapor was supplied through a tube made of SUS316 filled with each of the catalysts, and a reaction temperature was controlled by measuring a temperature of an upper portion of each of the catalysts by a thermocouple.

Experimental Examples 1 to 3

5 ml (about 6 g) of the baked and reduced catalyst of Example 1 was put into the catalytic reaction system, and a molar ratio (S/C) of water vapor and carbon monoxide of a feed gas was changed to 2.0 (Experimental Example 1), 2.5 (Experimental Example 2), and 3.0 (Experimental Example 3), to measure activity of the catalyst, and a water gas shift reaction was performed while changing a reaction temperature to 200 to 450° C. for each of the experimental examples.

Comparative Experimental Examples 1 to 3

Comparative experimental examples were performed in the same manner as in Experimental Examples 1 to 3, but using the catalyst prepared in Comparative Example 1, and a molar ratio (S/C ratio) of water vapor and carbon monoxide in a feed gas was changed to 2.0 (Comparative Experimental Example 1), 2.5 (Comparative Experimental Example 2), and 3.0 (Comparative Experimental Example 3), and a water gas shift reaction was performed.

Products therefrom were subjected to a condenser to condense remaining water vapor as water, and remaining product gases were quantitatively analyzed using a TCD analyzer of gas chromatography (GC, USA, Agilent 7890). CO shift rates at intervals of 50° C. of Experimental Examples 1 to 3 and Comparative Experimental Examples 1 to 3 were listed in Table 2.

TABLE 2

| | Catalyst | S/C (Molar Ratio) | CO Shift Rate (%) according to Reaction Temperature | | | | | |
|---|---|---|---|---|---|---|---|---|
| | | | 200° C. | 250° C. | 300° C. | 350° C. | 400° C. | 450° C. |
| Comparative Experimental Example 1 | CuZnAl | 2.0 | 71.6 | 83.6 | 86.8 | 84.4 | 82.7 | 78.0 |
| Comparative Experimental Example 2 | | 2.5 | 84.4 | 98.6 | 99.3 | 95.4 | 92.4 | 90.4 |
| Comparative Experimental Example 3 | | 3.0 | 86.5 | 92.9 | 95.9 | 95.0 | 93.0 | 89.3 |
| Experimental Example 1 | CuZnAl | 2.0 | 99.9 | 99.9 | 99.9 | 99.9 | 99.9 | 99.9 |
| Experimental Example 2 | | 2.5 | 99.9 | 99.9 | 99.9 | 99.9 | 99.9 | 98.5 |
| Experimental Example 3 | | 3.0 | 99.9 | 99.9 | 99.9 | 99.9 | 99.9 | 99.2 |

Figure 7:
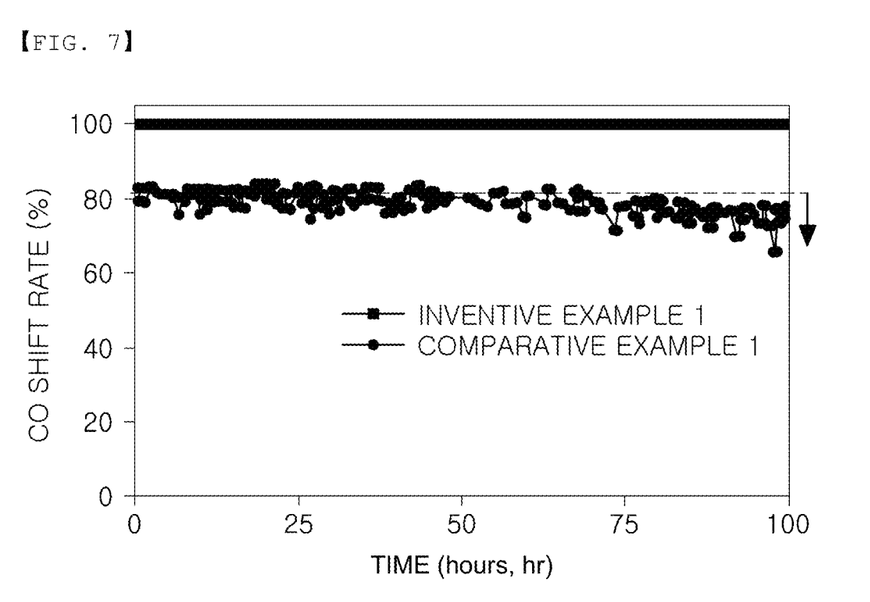
FIG. 7 is a graph comparing CO shift rates in Comparative Experimental Example 1 and Experimental Example 1 of Table 2, for 100 hours at 300° C.

In order to compare durability of the catalysts, as results of performing a water gas shift reaction at 300° C. for 100 hours under conditions of S/C of 2, a comparison of the listed CO shift rates was illustrated in FIG. 7. In addition, CO shift rates according to a reaction temperature of a catalyst after a long time (50 hours) performance evaluation were summarized in [Table 3].

TABLE 3

| | Catalyst | S/C (Molar Ratio) | CO Shift Rate (%) according to Reaction Temperature | | | | | |
|---|---|---|---|---|---|---|---|---|
| | | | 200° C. | 250° C. | 300° C. | 350° C. | 400° C. | 450° C. |
| Comparative Experimental Example 1 | CuZnAl | 2.0 | 68.5 | 75.1 | 78.3 | 78.5 | 73.6 | 70.7 |
| Experimental Example 1 | CuZnAl | 2.0 | 99.9 | 99.9 | 99.9 | 99.9 | 99.9 | 99.9 |

As listed in Table 3, the CuZnAl catalyst of Experimental Example 1 according to the present disclosure had a significantly higher carbon monoxide shift rate according to the reaction temperature, as compared to the CuZnAl catalyst of Comparative Experimental Example 1, and even after 50 hours, had a superior carbon monoxide shift rate, as compared to the CuZnAl catalyst of Comparative Experimental Example 1.

While example embodiments have been shown and described above, it will be apparent to those skilled in the art that modifications and variations could be made without departing from the scope of the present disclosure as defined by the appended claims.

The invention claimed is:

1. A method of preparing hydrogen, comprising providing a catalyst for a water gas shift reaction, to perform a water gas shift reaction,
wherein the catalyst for the water gas shift reaction comprises a catalytically active component containing 40 to 80 mol % of copper (Cu), 15 to 50 mol % of zinc (Zn), and 1 to 13 mol % of aluminum (Al), relative to all metals of the catalyst,
wherein an aluminum-rich layer is present in a surface layer of a particle of the catalyst,
wherein the catalyst is prepared by a catalyst preparation method comprising a copper-zinc coprecipitation operation of injecting a metal precursor solution containing a Cu precursor and a Zn precursor into a precipitant solution to coprecipitate copper and zinc, to produce a copper-zinc coprecipitate;
an Al precipitation operation of injecting an Al precursor solution into a solution containing the copper-zinc coprecipitate to precipitate aluminum on a surface of the copper-zinc coprecipitate, to prepare a CuZnAl catalyst precursor material having an aluminum-rich layer on a surface; and
a baking operation of baking the CuZnAl catalyst precursor material to prepare a CuZnAl catalyst,
wherein the copper-zinc coprecipitation operation is performed by aging a mixture of the metal precursor solution containing the Cu precursor and the Zn precursor, and the precipitant solution within a temperature range of room temperature (20° C.) to 80° C. for 30 to 180 minutes,
wherein the Al precursor solution is injected, after a phenomenon after which a pH is reduced to a range of 0.05 to 0.2 and is then returned during the aging.

2. The method of claim 1, wherein the catalyst is reduced under a hydrogen atmosphere of 280 to 500° C.

3. The method of claim 1, wherein the water gas shift reaction is carried out under conditions of a reaction temperature of 200 to 450° C. and a molar ratio of water vapor and carbon monoxide of 1.0 to 3.0.

4. The method of claim 1, wherein the aluminum-rich layer corresponds to 0.1 to 10% of a radius of the particle of the catalyst, from a surface of the particle of the catalyst.

5. The method of claim 1, wherein the Al precursor solution is injected after the copper-zinc coprecipitate is changed from an amorphous form to a crystalline form during the aging.

6. The method of claim 1, wherein the Al precipitation operation is performed by injecting the Al precursor solution into the solution containing the copper-zinc coprecipitate and then aging the same within a temperature range of room temperature (20° C.) to 80° C. for 15 to 60 minutes.

7. The method of claim 1, wherein the metal precursor solution containing the Cu precursor and the Zn precursor has a concentration of 0.01 to 1.5 M, and a molar ratio of Cu ions and Zn ions is 50:50 to 80:20.

8. The method of claim 1, wherein the Cu precursor, the Zn precursor, and the Al precursor are salts having at least one anion selected from the group consisting of $NO_3^-$, $SO_4^{2-}$, $CH_3COO^-$, $HCOO^-$, $Cl^-$, and $I^-$.

9. The method of claim 1, wherein the metal precursor solution containing the Cu precursor and the Zn precursor is injected into the precipitant solution until a pH is 5 to 8.

10. The method of claim 1, wherein the precipitant is at least one precipitant selected from the group consisting of alkali metal, carbonate or bicarbonate of Li, Na, K, or ammonium, NaOH, and $NH_4OH$.

11. The method of claim 1, wherein the precipitant solution has a temperature range of room temperature (20° C.) to 80° C., and a pH of 6 to 9.

12. The method of claim 1, wherein the precipitant solution has a concentration of 0.01 to 1.2 M.

13. The method of claim 1, wherein a concentration of the Al precursor solution is 0.01 to 1.5 M.

14. The method of claim 1, wherein the Al precursor solution is injected until a pH is 5 to 7.

15. The method of claim 1, wherein the catalyst preparation method further comprises:
a filtration and washing operation of filtering and washing a solution containing the CuZnAl catalyst precursor material obtained in the Al precipitation operation to obtain a CuZnAl catalyst precursor material; and
a drying operation of drying the obtained CuZnAl catalyst precursor material in an oven within a temperature range of 100 to 300° C. for 22 to 24 hours.

16. The method of claim 1, wherein the catalyst preparation method further comprises a reduction operation of performing a reduction reaction of the CuZnAl catalyst under a hydrogen atmosphere of 280 to 500° C.

* * * * *